United States Patent [19]

Lechner

[11] Patent Number: 5,033,902
[45] Date of Patent: Jul. 23, 1991

[54] DEVICE FOR CONNECTING MOUNTING CHANNELS

[75] Inventor: Peter Lechner, Jona, Switzerland

[73] Assignee: Geberit AG, Jona, Switzerland

[21] Appl. No.: 540,710

[22] Filed: Jun. 20, 1990

[30] Foreign Application Priority Data

Jun. 20, 1989 [CH] Switzerland .................. 2289/89

[51] Int. Cl.⁵ ............................................. B25G 3/00
[52] U.S. Cl. .................................... 403/254; 403/167
[58] Field of Search .............. 403/167, 168, 254, 252, 403/255

[56] References Cited

U.S. PATENT DOCUMENTS 958,933  5/1910  Love ..................................... 403/72
4,799,819  1/1989  Swoboda ........................ 403/254 R Primary Examiner—Andrew V. Kundrat
Attorney, Agent, or Firm—Pollock, Vande Sande & Priddy

[57] ABSTRACT

Device for connecting two parallel mounting channels (4,5) to one another during the installation of a temporary wall. An anchoring member (6,7) is inserted into each channel (4,5). Connecting pieces (1,2) have on one front end flexible stop lugs (1c), which interact with corresponding stop surface in the anchoring member (6,7). The two connecting pieces (1,2) are held together by a clamp (3) that is slid on. The device can be made largely of plastic and can be assembled quickly and reliably without tools.

9 Claims, 2 Drawing Sheets

DEVICE FOR CONNECTING MOUNTING CHANNELS

FIELD OF THE INVENTION

The invention relates to a device for connecting C-shaped channels, in particular mounting channels.

BACKGROUND OF THE INVENTION

A holding device for mounting hygienic apparatuses on a temporary wall is known from applicant's CH-A-66 721, in which the device comprises two steel plates which can be screwed together and whose ends are inserted into a mounting channel.

SUMMARY OF THE INVENTION

The invention is based on the technical problem of providing a device of the aforementioned kind, which enables simpler and faster assembly and yet enables firm attachment even of heavy hygienic apparatuses and fittings. The connecting pieces can be connected to the channels in the desired position with a simple, short movement. Time-consuming displacement of these parts in the longitudinal direction of the channels is unnecessary. The device can also be inserted between two other devices; this could not heretofore be done without detaching such other devices.

The connection can be made especially quickly and simply if the connecting pieces have stop lugs which interact with corresponding stop surfaces in the channels.

An especially stable connection results from inserting into the channels anchoring members braced against the inner sides of the channels.

A firm connection without such members is also possible if the connecting pieces have spreadable parts.

According to one embodiment of the invention, the connecting pieces have meshing corrugations and a clamp which, jointly with the corrugations, holds the connecting pieces together. Such a device can be adjusted simply and without tools to the distance between the two channels.

BRIEF DESCRIPTION OF THE DRAWINGS

In order that the invention may be more clearly understood, two embodiments thereof will now be described with reference to the accompanying drawings.

DESCRIPTION OF PREFERRED EMBODIMENTS

Figure 1:
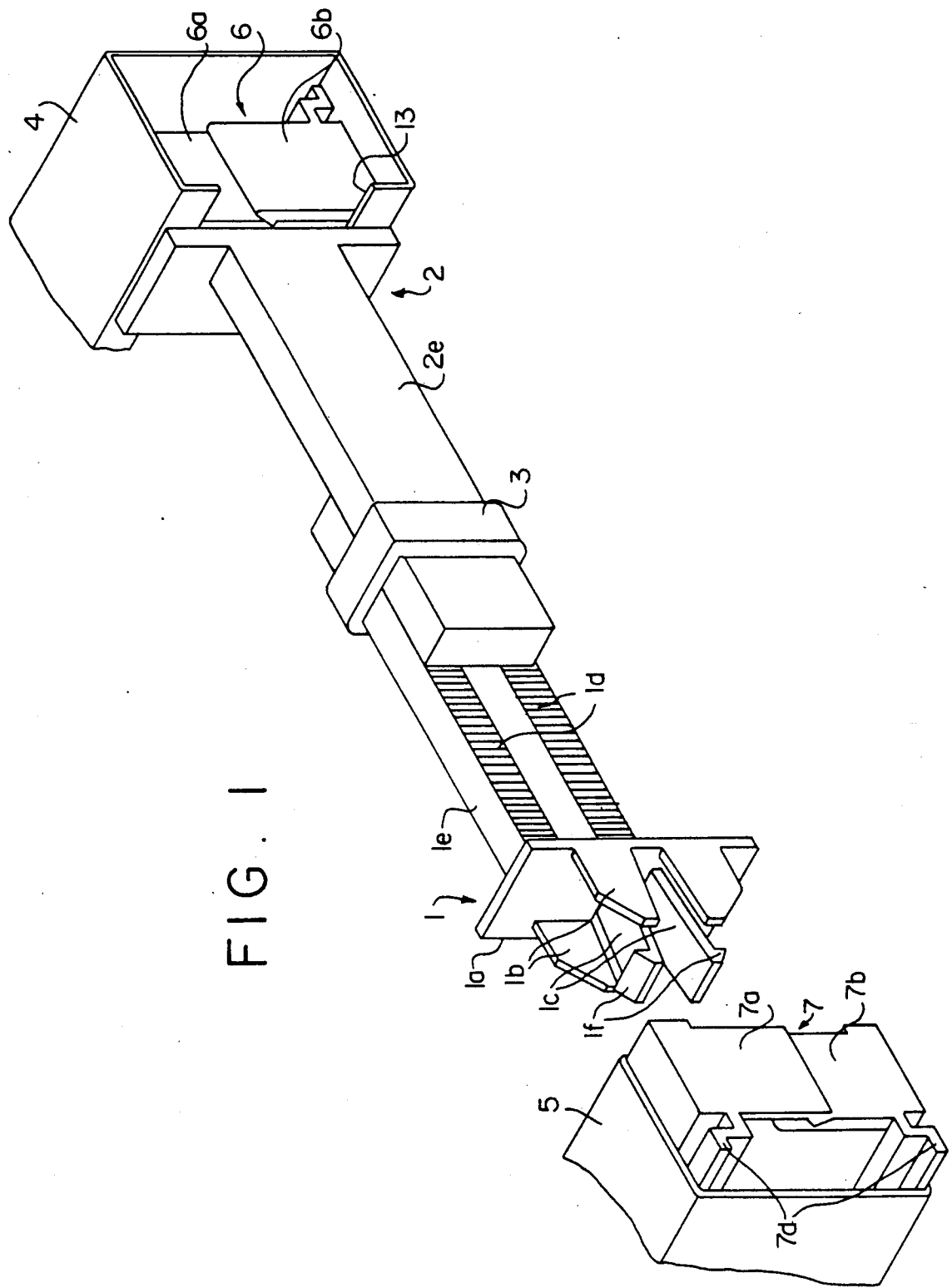
FIG. 1 is an exploded perspective view of the device according to the invention, wherein only one connecting piece is connected to a channel.
Figure 2:
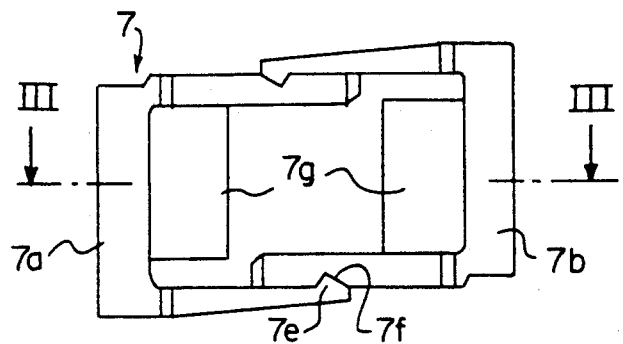
FIG. 2 is a view of an anchoring member.
Figure 3:
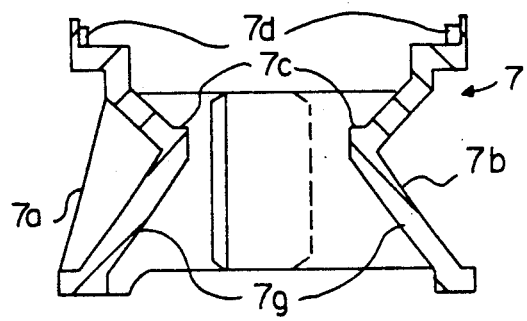
FIG. 3 is a sectional view of the anchoring member along line III—III of FIG. 2.

The device shown in FIGS. 1 to 3 has two connecting pieces 1 and 2, each made of plastic in one piece. These connecting pieces 1 and 2 are detachably connected to one another by a metal clamp 3 and comprise on their free ends two flexible stop lugs 1c, which cooperate with corresponding stop surfaces 7c (FIG. 3) on the inner side of an anchoring member 6 or 7. As shown in FIG. 1, each anchoring member 6 or 7 is inserted into a mounting channel 4 or 5. The parallel channels 4 and 5 have an elongated slot and serve in particular for the attachment of cladding plates. As a rule, one of channels 4 or 5 is fastened to a building wall. Channels 4 and 5 have C-shaped cross-sections and normally extend horizontally or vertically and are usually connected to one another by several devices according to the invention.

Connecting pieces 1 and 2 and anchoring members 6 and 7 are, respectively, completely identical.

As shown in FIGS. 2 to 5, the anchoring members each comprise two separately manufactured parts 7a and 7b, which can be inserted loosely through slot 13 into channel 4 or 5. In the channel, parts 7a and 7b are displaced relatively to one another until latches 7e and stop grooves 7f mesh and hold together the two parts 7a and 7b. It is important that the anchoring member 7, which is at this stage approximately square, be braced on all sides on the inner side of the channels, and thus can no longer be moved substantially in a direction transverse to the longitudinal direction of the channel. However, simple sliding displacement in the longitudinal direction of channel 4 or 5 is still possible. In particular, two extensions 7d, Z-shaped in cross-section and braced at parallel inner edges of channel 4 or 5, respectively, serve as support.

The anchoring members have guide surfaces 7g and stop surfaces 7c, which are adapted to the flexible stop lugs 1c and which permit simple, rapid and reliable locking connection of anchoring members 6 or 7 with connecting pieces 1 or 2. The guide surfaces 7g are so arranged that, in the drawing of FIG. 3, the stop lugs 1c can be inserted from below into the anchoring member 7, lugs 1c being pressed against one another by guide surfaces 7g. After connecting piece 1 or 2 has somewhat approached the anchoring member, the stop position is automatically produced by the spreading of lugs 1c. In the stop position, stop surfaces 7c and 1f of lugs 1c are engaged.

In the aforementioned stop position, a collar 1a abuts channel 5 so that further movement of connecting piece 1 transversely to the channel in both directions is no longer possible. In the stop position, side pieces 1b also reach into anchoring member 7 and further stabilize connecting piece 1 or 2.

The attachment of the device according to the invention to both channels 4 and 5 will now be explained. First, anchoring members 6 and 7 are inserted into channels 4 and 5 and moved in these channels until they are located opposite one another in the desired position. At this stage, connecting pieces 1 and 2 are slid one at a time through slot 13 into anchoring members 6 and 7 and moved into the stop position, one of the connecting pieces carrying clamp 3. This clamp 3 is now displaced until it holds together the two shafts 1e and 2e, as shown in FIG. 1. At the same time, corrugations 1d mesh on the inner sides of shafts 1e and 2e so that further head-on longitudinal displacement of these shafts is no longer possible. When the connection is completed, stop lugs 1c force parts 7a and 7b of the connecting pieces apart and against inner surfaces of channels 5 or 4, so that the inventive device can hardly move further even in the longitudinal direction of the channels. The assembly is carried out without tools.

Figure 4:
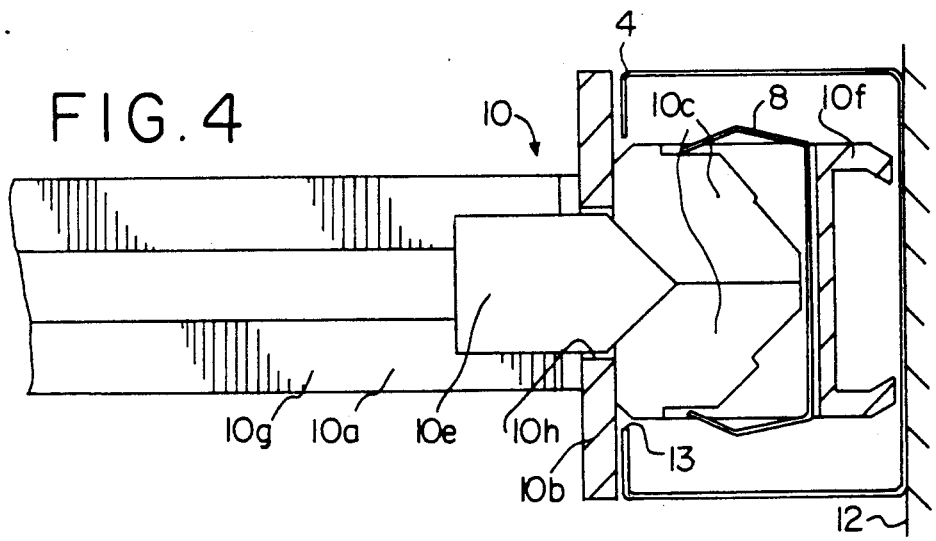
FIG. 4 is a partial view of a second embodiment of the device according to the invention, wherein the connection with the channel is incomplete.
Figure 5:
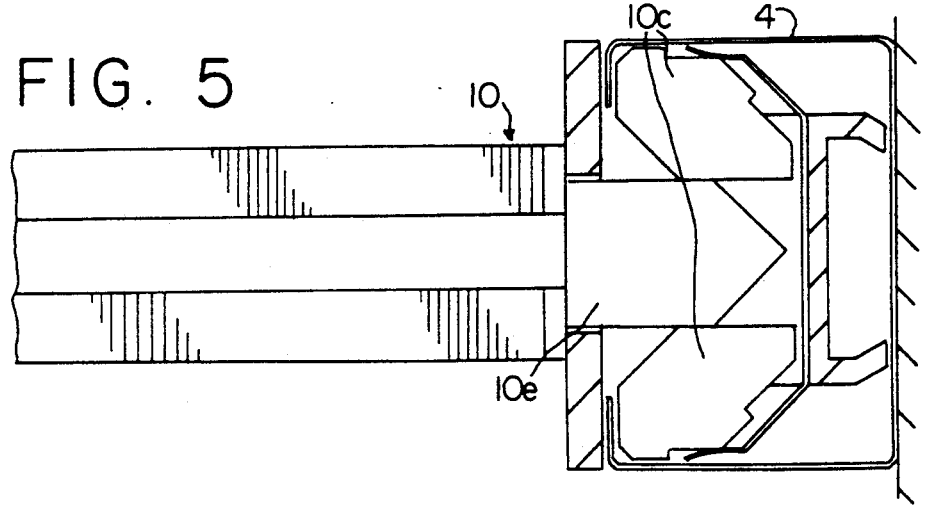
FIG. 5 is a view similar to FIG. 4, showing the completed connection.

In the embodiment of FIGS. 4 and 5, two wholly identical connecting pieces 10 are provided. They are also held together by means of clamps 3, shown in FIG.

1. However, in this embodiment, separate anchoring members are not provided. Connecting piece 10 also has a shaft 10g with corrugations 10a and a collar 10b, which abuts channel 4 on the outside in the stop position. However, here collar 10b has laterally, next to shaft 10g, a continuous opening 10h, through which a wedge 10e can be pushed between two parts 10c. These parts 10c are held together flexibly by a C-shaped metal spring clamp B. Both spring clamp B and parts 10c are housed in a shoulder 10f molded on the front at collar 10b.

To produce the connection between channel 4 and connecting piece 10, shoulder 10f is pushed through slot 13 into channel 4 until collar 10b abuts channel 4 on the outside, and the position shown in FIG. 4 is reached. At this stage, wedge 10e is pushed through opening 10h, and both parts 10c are thereby forced apart against the resetting force of spring clamp B, so that the position shown in FIG. 5 is reached. As will be apparent, in the spread-apart position parts 10c abut against the inside of channel 4. Similarly, the periphery of shoulder 10f internally abuts channel 4, so that the locked connecting piece 10 can no longer be moved substantially.

In summary, the invention comprises a device for connecting channels, which can be assembled quickly and simply and which, nevertheless, provides a very firm and form-locking connection. The device can be made largely of plastic, thereby minimizing the transmission of structure-borne noise and reducing the decibel level. This is especially important for the wall installation of supply lines, sewage lines, and toilet flush tanks, and has been sought for a long time.

What is claimed is:

1. Means for connecting channels (4, 5) located at a distance from one another and each having a substantially C-shaped cross-section, said means comprising two connecting pieces (1, 2) each having an end extending into one of said channels (4, 5), means (3) for detachably connecting said connecting pieces, said connecting pieces (1, 2) being adapted to be inserted into said channels (4, 5) transversely to a longitudinal direction of said channels and to be connected to said channels (4, 5) through spreading of said ends of said connecting pieces (1, 2), wherein said connecting pieces (1, 2) each comprise a collar adapted to be braced on an exterior of a channel (4, 5).

2. Means for connecting channels (4, 5) located at a distance from one another and each having a substantially C-shaped cross-section, said means comprising two connecting pieces (1, 2) each having an end extending into one of said channels (4, 5), means (3) for detachably connecting said connecting pieces, said connecting pieces (1, 2) being adapted to be inserted into said channels transversely to a longitudinal direction of said channels (4, 5) and to be connected to said channels (4, 5) though spreading of said ends of said connecting pieces (1, 20), wherein said connecting pieces (1, 2; 10) each have a shaft (1e; 10g) with corrugations (1d; 10a) extending over substantially the entire length of said shaft (1e; 10g), a clamp (3) being provided for connecting said two connecting pieces (1, 2; 10) through meshing of their respective corrugations (1d; 10a).

3. Means for connecting channels (4, 5) located at a distance from one another and having a substantially C-shaped cross-section, said means comprising two connecting pieces (1, 2) each having an end extending into one of said channels (4, 5), means (3) for detachably connecting said connecting pieces, said connecting pieces (1, 2) being adapted to be inserted into said channels transversely to a longitudinal direction of said channels (4, 5) and to be connected to said channels (4, 5) through spreading of said ends of said connecting pieces (1, 2) and comprising anchoring members (6, 7) cooperating with a said connecting piece (1, 2) and being bracedly inserted into said channels (4, 5) on inner sides of said channels (4, 5).

4. Means according to claim 3, wherein said anchoring members (6, 7) each comprise a plurality of interconnected detachable parts (7a, 7b).

5. Means according to claim 3, wherein said connecting pieces (1, 2) have, on said ends to be inserted into said channels, flexible stop lugs (1c) which interact with corresponding stop surfaces (7c) of said anchoring members (6, 7) within said channels (4, 5).

6. Means as claimed in claim 3, wherein said connecting pieces (10) have, on said ends to be inserted into channels (4, 5), parts (10c, 10d) adapted to be spread transversely to a longitudinal direction of said channels (4, 5).

7. Means as claimed in claim 6, wherein said connecting pieces (10) each comprise a wedge (10e) which, upon being pushed between said two parts (10c, 10d), forces apart said two parts transversely to said longitudinal direction of said channels (4, 5).

8. Means as claimed in claim 6, comprising a spring clamp (8) which holds said connecting pieces (10) in position.

9. Means as claimed in claim 3, wherein said connecting pieces (1, 2, 10) are made of plastic.

* * * * *